United States Patent
Gibson et al.

(10) Patent No.: US 7,041,021 B2
(45) Date of Patent: May 9, 2006

(54) WEAR RESISTANT BELTS, AND A PROCESS FOR THEIR MANUFACTURE

(75) Inventors: Daniel Pattie Gibson, Dumfriesshire (GB); James Gordon Mackintosh, Dumfries (GB)

(73) Assignee: The Gates Corporation, Denver, CO (US)

( * ) Notice: Subject to any disclaimer, the term of this patent is extended or adjusted under 35 U.S.C. 154(b) by 356 days.

(21) Appl. No.: 10/164,267

(22) Filed: Jun. 5, 2002

(65) Prior Publication Data

US 2002/0179228 A1    Dec. 5, 2002

Related U.S. Application Data

(63) Continuation of application No. 09/557,886, filed on Apr. 21, 2000, now Pat. No. 6,419,775.

(30) Foreign Application Priority Data

Apr. 21, 1999    (GB) .................................. 9909178.7

(51) Int. Cl.
*F16G 5/20* (2006.01)
(52) U.S. Cl. ........................ 474/205; 156/139
(58) Field of Classification Search ................ 156/137, 156/138, 139; 474/205
See application file for complete search history.

(56) References Cited

U.S. PATENT DOCUMENTS

| | | | |
|---|---|---|---|
| 3,138,962 A | 6/1964 | Haines et al. | |
| 3,200,180 A | 8/1965 | Russ et al. | |
| 3,621,727 A | 11/1971 | Cicognani | |
| 3,772,929 A | 11/1973 | Redmond, Jr. | |
| 3,894,900 A | 7/1975 | Redmond, Jr. | |
| 3,964,328 A * | 6/1976 | Redmond, Jr. ............... 474/205 |
| 4,024,773 A | 5/1977 | Hartman et al. | |
| 4,031,768 A | 6/1977 | Henderson et al. | |
| 4,066,732 A | 1/1978 | Redmond, Jr. | |
| 4,196,249 A * | 4/1980 | Patrichi ........................ 442/70 |
| 4,330,287 A | 5/1982 | Fischer | |
| 4,332,576 A | 6/1982 | Stecklein et al. | |
| 4,464,153 A | 8/1984 | Brew | |
| 5,362,281 A | 11/1994 | Dutton et al. | |
| 6,054,527 A * | 4/2000 | Voss et al. ................... 524/834 |
| 6,124,045 A | 9/2000 | Soda et al. | |

FOREIGN PATENT DOCUMENTS

EP    0 240 936 A2    10/1987

(Continued)

OTHER PUBLICATIONS

Skura et al, "Toothed Belt with Tetrafluoroethylene surface" The Gates Corporation Tecnical Developments Bulletin, vol. 2, Nov. 1994, pp. 1-4.*
The Whitford Worldwide publication, pp. 1-3.*
A Whitford internet publication on a XYLAN coating compositions dated Feb. 2, 2005.*

(Continued)

*Primary Examiner*—Sam Chuan Yao
(74) *Attorney, Agent, or Firm*—C. H. Castleman, Esq.; J. A. Thurnau, Esq.; J. L. Mahurin, Esq.

(57) ABSTRACT

Endless power transmission belts and processes for their manufacture, having power transmitting surfaces comprising a wear resistant composite, which belts exhibit improved abrasion- or wear resistance, reduced noise, reduced frictional heat generation, and improved dimensional stability compared to known belt constructions, as well as processes for manufacturing same. More particularly, an endless toothed belt having an abrasion- and noise resistant cover element, which comprises at least one friction-modifying constituent and at least one binder constituent.

12 Claims, 1 Drawing Sheet

FOREIGN PATENT DOCUMENTS

| | | |
|---|---|---|
| EP | 0 695 627 A1 | 2/1996 |
| EP | 1 035 353 A1 | 9/2000 |
| JP | 61065937 | 4/1986 |
| JP | 07151190 | 6/1995 |
| JP | 09273603 | 10/1997 |
| WO | PCT/US99/12956 | 12/1999 |
| EP | 0 662 571 A1 | 7/1995 |

OTHER PUBLICATIONS

Whitford Plastics, "Sticky designs are no problem with slippery coatings"Design Engineering, Oct. 1992, p. 70.

Skura et al, "Toothed Belt with Tetrafluoroethylene Surface" The Gates Corporation Technical Developments Bulletin. Vo. 2. Nov. 1994. p. 1-4.

* cited by examiner

FIG. 1

WEAR RESISTANT BELTS, AND A PROCESS FOR THEIR MANUFACTURE

This application is a continuation of U.S. application Ser. No. 09/557,886, filed 21 Apr. 2000, now U.S. Pat. No. 6,419,775.

BACKGROUND OF THE INVENTION

The present invention relates to endless belts having power transmitting surfaces exhibiting high wear resistance, and more particularly to endless toothed belts having a wear-resistant fabric cover intimately positioned along the outer surface of the tooth and land portions of the belt, and having a coating adhered to the outer surface of and preferably partially penetrated into the fabric cover, as well as to a method for producing such belts. The coating comprises a wear-resistant composite, which provides improved wear- or abrasion resistance and improved frictional characteristics to the belt, particularly under high load operation thereof.

Endless belts, including V-belts, V-ribbed belts, and flat belting, as well as toothed belts such as synchronous or timing belts and the like, are used in a variety of applications. Examples of power transmission belts, including toothed or synchronous belts, V-belts, and V-ribbed belts are disclosed in U.S. Pat. Nos. 3,138,962; 3,200,180; 4,330,287; and 4,332,576. Examples of methods for producing such belts are disclosed in U.S. Pat. No. 3,200,180 as indicated above and U.S. Pat. Nos. 3,772,929 and 4,066,732. These patent references are merely examples of various types of power transmission belts and state-of-the-art formation techniques thereof.

Toothed belts, generally comprising an elastomeric body portion, an essentially non-extensible reinforcing member and a plurality of driving teeth extending along the underside of the belt at a predetermined pitch, are put to particularly good use in high temperature, high speed and/or high load environments, including various industrial and automotive drive systems. In automotive applications, there is a growing demand for toothed belts which can perform successfully under increasingly high loads and at average operating temperatures of about 120° C. Operating temperature requirements for such applications are expected to reach 150° C. or greater in the near future.

Under such high load, high temperature and/or high-speed conditions, it is common for the teeth of endless toothed belts to deteriorate; the severe shearing stresses on the teeth often result in crack generation and tooth loss. A wear-resistant fabric cover element is used over the tooth and land portions of such belts to shield the elastomeric teeth from such stresses. This modification alone however has not proved completely satisfactory in some particularly demanding applications. Upon extended high load or high-speed operation, such fabric covers tend to wear away, resulting in dimensional changes and/or premature belt failure. Moreover, there is a tendency in such constructions for the underlying belt elastomer to migrate through the weave of the fabric cover during the curing process and/or upon operation, and to thus become exposed at the belt's power transmitting surface. The presence of this relatively high coefficient of friction material at the belt's power transmitting surface results in high noise and frictional heat generation at the belt-sprocket interface upon operation of the belt. Noise generation is viewed as highly undesirable, and frictional heat generation and heat build-up reduce the life of the belt.

One proposed solution to the noise generation and/or frictional heat build up problems common in conventional belt operation has been to reduce the effective coefficient of friction of the power-transmitting surface of the belt. One such approach involves isolating or removing as much of the elastomer as possible from near the surface of the belt where that surface comes in contact with sprocket teeth. Such an approach is taken for example in U.S. Pat. No. 3,772,929, wherein the outer surface of a wear-resistant fabric covering is kept free of belt elastomer, by the presence of a bonded layer of elastomer impervious material adhered to such outer surface.

A second approach has been to incorporate a relatively pure polytetrafluoroethylene (PTFE) layer over the wear-resistant fabric cover element to decrease the effective coefficient of friction of the driving surface of the belt.

A third approach, directed moreover to improving abrasion resistance, has involved coating the motion-transmitting surfaces of a belt with a polymer matrix comprising a fluorine-containing plastic. In European Patent Publication No. 0662571A1, a process for producing the belts is disclosed including the steps of applying such matrix onto the motion-transmitting surfaces of the belt, and then drying the matrix such that it goes through a crosslinking process for bonding itself to the elastomeric belt element.

None of these approaches to the problems of abrasion, noise and/or frictional heat generation in endless belt constructions is believed to be completely satisfactory, particularly in very high load applications. Where the belt surface remains free of belt elastomer by means of a relatively poor abrasion-resistant or low temperature laminate coating on the outer surface of a fabric cover element, high load or high temperature operation generally results in flaking off or melting of the coating. Generally, as a low temperature, low abrasion-resistant laminate flakes or melts off of the fabric layer with continued use, the distance between the center of the load carrying members of the belt and the bottom surface of the land portions between adjacent longitudinally spaced teeth decreases. This dimensional change affects the pitch line diameter of the belt and results in poor tooth-sprocket fit, hence increased belt noise. Moreover, as the coating layer diminishes, the fabric cover becomes exposed to the sprocket, ultimately leading to deterioration of such layer and exposure of the belt elastomer.

A substantially pure PTFE layer incorporated on the surface of a wear-resistant fabric cover element, while producing a reduced coefficient of friction at the driving surface, exhibits very poor wear resistance, and thus would likely wear off of the belt with use, again leaving the wear-resistant fabric layer exposed and presenting the concomitant problems associated therewith, described above.

The incorporation of a coating on a wear-resistant cover element, which comprises a matrix cross-linkable with the belt body and containing a fluorine-containing plastics material, is believed to be similarly inadequate. Application of such coating onto a fabric surface according to the teachings of that disclosure has been found to result in deposition of only a relatively thin layer at the belt surface, which has been found to exhibit inferior wear resistance. It is believed that in the construction proposed in the reference, a relatively large amount of the total fabric cover thickness remains free of the coating material, hence fiber-to-fiber abrasion occurs within the fabric upon operation of the belt. This is believed to lead to a wearing away of portions of the fabric itself, and thus potentially diminished operating life.

Thus, known endless belt constructions or processes for their manufacture have not effectively addressed the combined problems of belt noise, frictional heat generation, and dimensional instability.

Consequently, there remains a need to produce an endless belt, including an endless toothed belt for use in high temperature dynamic applications, which exhibits improved wear resistance, reduced noise during belt operation, which does not exhibit significant frictional heat generation, and which otherwise remains dimensionally stable for an appreciable, predictable operating lifetime.

SUMMARY OF THE INVENTION

Accordingly, it is a primary object of the invention to provide an endless belt which overcomes drawbacks of prior constructions, and in which the belt exhibits reduced noise generation, reduced heat generation, improved wear resistance and dimensional stability, all over a generous, predictable operating lifetime.

It is another object of the present invention to provide a method for producing belts of the aforementioned type.

It is a further object to provide such belt which exhibits exceptional adhesion between the fabric cover and wear-resistant coating on the one hand, and the underlying elastomer belt elements on the other substantially throughout its operating life.

To achieve the foregoing and other objects and in accordance with a purpose of the present invention as embodied and broadly described herein, a power transmission belt is provided, having an elastomeric body portion and a fabric cover element covering at least the wear-dependent, power transmitting portions of the belt, and having a wear-resistant, friction-modifying composite coated on the surface of the fabric cover element, and penetrated into within at least a portion of the total thickness of the fabric cover element, preferably such that the wear-resistant composite is substantially separated from the elastomeric body portion by a boundary. In a preferred embodiment, at least a portion of the friction-modifying constituent of the wear-resistant composite is separated from the matrix portion of the wear-resistant composite, by a gap or boundary.

In a further embodiment, a method for the manufacture of an endless belt of the type noted above is provided, comprising the steps of treating a fabric cover element with a fabric treatment material comprising at least one cross-linkable constituent, such that at least one of the voids in the fabric remains at least partially free of the fabric treatment material; applying a wear-resistant, friction-modifying composite comprising at least one binder constituent and one friction-modifying constituent to a first surface of the fabric cover element; causing at least a portion of the wear-resistant composite to penetrate at least a portion of the total thickness of the fabric cover element so that some of the friction-modifying constituent resides within one or more voids in the fabric; and polymerizing the wear-resistant composite. Belts which may be beneficially produced according to the claimed method include V-belts, V-ribbed belts, flat belting or toothed belts such as synchronous or timing belts, In still another embodiment, an endless belt is provided wherein a wear-resistant, friction-modifying composite coats the outer surface of and penetrates into a portion of the total thickness of the fabric cover element, but does not penetrate through the entire thickness thereof.

In yet another embodiment, an endless toothed belt and a process for its manufacture are provided, the belt having a tensile-loaded body portion composed of an elastomeric material, a plurality of spaced teeth bonded with and disposed along at least the inner periphery of the body portion, a layer of wear-resistant fabric positioned substantially along the periphery of at least the alternating teeth and land portions of the belt, and a wear resistant, friction modifying composite layer positioned substantially along the outer surface of, and penetrated into at least a portion of, the wear-resistant fabric. The process is characterized in that the fabric cover element is first treated with a fabric treatment material containing at least one cross-linkable constituent, at a pick-up rate of from about 1% to less than about 30%, based on fabric weight; the wear-resistant composite is applied to a first, power transmitting surface of the fabric cover, the composite-coated fabric cover element is applied to the belt body portion, and the belt is cured or vulcanized. In this embodiment, the endless belt may be of any conventional form wherein a wear-resistant fabric is positioned along at least the tooth and land portions of the belt, including for example, synchronous or timing belts and dual-sided toothed belts.

BRIEF DESCRIPTION OF THE DRAWINGS

The accompanying drawing which is incorporated in and forms a part of the specification, illustrates a preferred embodiment of the invention, and together with the description, serves to explain the principles of the invention. In the drawing.

DETAILED DESCRIPTION

Figure 1:
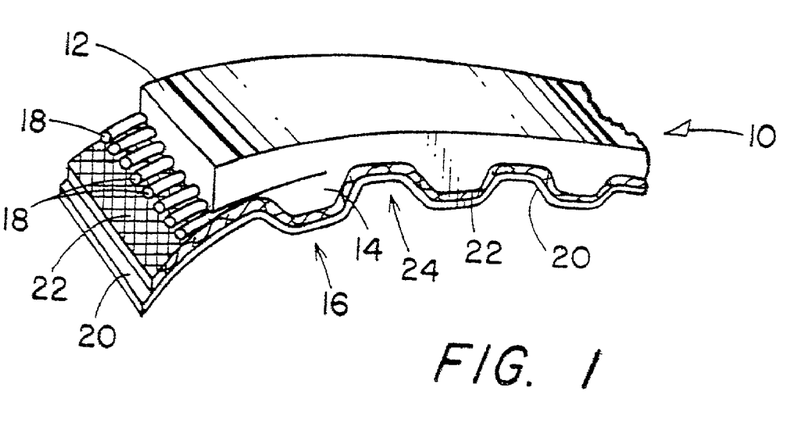
FIG. 1 is a fragmentary, perspective view of a synchronous belt constructed in accordance with one embodiment of the present invention.

Referring to FIG. 1, an endless synchronous-type power transmission belt 10 is shown generally. The belt includes a body having an overcord section 12 formed from a suitable elastomeric material and a series of spaced cogs or teeth 16, also comprising a suitable elastomeric material 14. The elastomeric material or materials utilized in the overcord section 12 and teeth 16 should be compatible with one another and may be of the same or of different types of elastomer. Any suitable castable or non-castable elastomer may be used as the overcord or belt body elastomer, and/or the tooth portions in this embodiment of the present invention, but in a preferred embodiment at least one and preferably both of the overcord portion 12 and the teeth 16 of the belt 10 are formed of a suitable hydrogenated acrylonitrile butadiene rubber (HNBR) composition.

The elastomer overcord section 12 is preferably loaded with a reinforcing tensile layer or a plurality of tensile members, many of which are well known to the art, such as the longitudinally extending and spaced tensile cords 18 as shown. These tensile members may consist of one or more strands of any suitable stress-resistant material including but not limited to polyamide cord, aramid cord, glass fiber cord, carbon cord, polyester cord or filament wire cord, typically disposed as one or more embedded helically-wound cords. The tensile members may be pre-stressed or impregnated with a suitable material as well known in the art, if desired. The elastomeric belt body may preferably be loaded with discontinuous fibers as is well known in the art, by the incorporation within the elastomer of suitable and/or conventional material including staple fiber, pulp fiber or chopped fiber reinforcement materials. Suitable materials for fiber loading include for example aramids, including meta- and para-aramids, such as those available by DuPont Chemical Co. under the trademark, KEVLAR; nylon, polyester and cotton. Fiber loading may be at any level suitable for the application, and may include orientation of at least a substantial number of the fibers in a direction perpendicular to the travel of the belt. One or more such fibers may moreover protrude from the elastomeric material as is generally known.

A wear-resistant fabric layer 22, or reinforcing fabric cover element intimately fits along at least the alternating teeth 16 and alternating land portions 24 of the belt 10 as shown to form a face cover therefor. This fabric may be of any desired configuration such as a conventional weave consisting of warp and weft threads at any desired angle, or may consist of pick cords, or of a knitted or braided configuration, or the like. More than one ply of fabric may be employed. If desired, the fabric may be cut on a bias so that the strands form an angle with the direction of travel of the belt. Conventional fabrics may be employed using such materials as cotton, polyester, polyamide, aromatic polyamide, hemp, jute, fiberglass and various other natural and synthetic fibers. In a preferred embodiment of the invention, the fabric layer 22 comprises an expansible wear-resistant 3×3-twill weave fabric in which at least one of the warp or weft threads is formed of nylon 6,6. At least one of the warp or weft yarns may moreover be texturized, twisted and/or otherwise processed, as is well known in the art.

In a more preferred embodiment of the present invention to be described in further detail below, the fabric comprises nylon 6,6 yarns having a tensile strength of at least 6.0 g/decitex in their initial state in both the warp and weft directions. At least one of the warp and weft yarns is preferably texturized, or woolly processed, to yield a fabric having at least 80% elongation at a 2-kg load, as measured on a 25 mm strip. According to this same preferred embodiment, the finished weight of the fabric is preferably at least 385 g/m$^2$, of which at least 90% of the weight is preferably in the woolly processed direction, i.e., in the direction of travel of the belt.

A wear-resistant, friction-modifying composite 20 is positioned along at least a portion of the outer surface of the fabric cover element 22. The composite 20 is applied and/or fabric cover 22 treated so that, in a preferred embodiment, the coating penetrates at least a substantial portion of the total thickness of the wear-resistant fabric layer 22. In a more preferred embodiment of the invention, the wear-resistant, friction-modifying composite 20 penetrates less than the entire thickness of the fabric layer 22.

In an additional preferred embodiment, a second fabric cover element (not shown) may be utilized on the outer surface of the overcord section 12 of the power transmission belt 10 opposite that having tooth 16 and land 24 portions. This second fabric cover element may be of the same or different materials and construction as those set forth above, and may preferably furthermore include a wear-resistant composite as described above and in further detail below, or any other type of suitable coating. As is generally known in the art, the incorporation of such additional fabric cover element on a surface of the belt remote from the power transmitting surface has been found to increase the edge wear resistance of the belt, thus potentially improving the operating life expectancy thereof.

The novel use of a wear resistant composite layer according to one embodiment of the present invention, as a coating upon and penetrant within a wear-resistant fabric tooth and land covering of an endless toothed belt overcomes the shortcomings of the prior art, by providing a finished endless toothed belt which exhibits minimal noise, which retains substantial dimensional stability for the life of the belt, which exhibits improved wear- or abrasion-resistance properties and which minimizes frictional heat generation during operation of the belt. The novel use of such wear-resistant, friction modifying composite which penetrates a substantial portion, but less than the entire thickness of a fabric cover overcomes shortcomings of the prior art by providing an endless toothed belt which exhibits improved adhesion between the fabric layer and wear-resistant composite on one side, and the belt elastomer on the other. According to the present invention, the wear-resistant, low coefficient-of-friction coating is believed to penetrate at least a portion of the fiber bundles and interstices between individual yarns, to reduce fiber-to-fiber abrasion within the fabric, thus reducing this potential source of fabric wear. The present construction is believed to moreover form an appreciable reservoir of friction-reducing material inside the fabric cover element, and essentially continuously lubricate the fibers at the tooth-sprocket interface for essentially the entire, undiminished operating lifetime of the belt.

The wear resistant, friction-modifying composite useful in the practice of the present invention preferably exhibits sufficient flexibility to be utilized successfully in belts which may be driven about the increasingly small radius sprockets and/or sheaves commonly encountered in automotive engine compartments. The composite preferably comprises a frictional modifier, which imparts a reduced coefficient of friction to the composite, and a resin, or other suitable binder, which contributes to the abrasion-resistance properties of the material. To facilitate application of the composite in the belt-building process, the composite may preferably be contained in a carrier solution, e.g., water or an organic solvent, which may preferably be allowed to liberate upon application of the composite to the associated workpiece.

In a preferred embodiment, the wear resistant composite useful in the present invention comprises a dispersion of one or more friction-modifying components in the form of fluoropolymers in a carrier or binder. In a preferred embodiment, the fluoropolymers include but are not limited to polytetrafluoroethylene polymers (PTFE), polytrifluoromonochloroethylene polymers (PTFCE), polyvinylidene fluoride polymers (PVDF), fluorinated ethylene polymers (FEP) and perfluoroalkoxy polymers (PFA). Additional friction-modifying materials which may be beneficially employed in this regard for example may include molybdenum disulphide and graphite.

The wear-resistant composite moreover preferably comprises one or more binder resins for facilitating the coating process and for contributing to the performance of the final coating. The resin or resins may be any suitable material or blend thereof within which the frictional modifier may be dispersed or suspended, and which may or may not be polymerizable as by cross-linking or chain-extension, with itself and/or the underlying belt materials, but which is preferably at least partially polymerizable, i.e., cross-linkable or capable of chain extension, to improve bonding of the coating within the belt construction. In a preferred embodiment, the composite binder forms a matrix within which the friction-modifying constituent is dispersed in the final coating. According to this preferred embodiment, at least a portion of the friction-modifying constituent, which may be in the form of individual particles or groups of such particles dispersed throughout the matrix, is at least partially separated from the binder constituent by gaps or boundaries. While not intending to be limited to a particular theory, it is presently believed that this separation of at least a portion of the friction-modifying constituent from the material of the binder matrix within which it is dispersed provides a beneficial effect in the final belt, without adversely affecting adhesion between the frictional modifier and binder constituents, or between the wear-resistant composite and the fabric cover element. It is presently believed that the gaps or boundaries between portions of frictional modifier particles and the surrounding binder matrix allow for some degree of movement of the particles within the matrix. This attribute is furthermore believed to contribute to the continuous lubrication of individual fabric cover element fibers to decrease wear thereof, and to provide an essentially continuous source of additional frictional modifier material at the belt-sprocket or -sheave interface.

This highly wear resistant composite remains substantially intact on the belt's surface for the useful life of the belt, and preferably generally will not melt off at the high temperatures now commonly encountered in engine compartments. The wear resistant composite has good abrasion- or wear resistance, and therefore does not readily flake or wear off of the wear-resistant fabric cover element of the endless belt during the belt's life. The composition exhibits an effective coefficient of friction which is preferably lower than the coefficient of friction of the belt body elastomer thus reducing overall frictional heat build-up and noise-generation characteristics, and improving the overall efficiency of the belt. Preferred composites for use in the practice of the present invention are generally commercially available, and may preferably comprise a blend of binder resins, pigments and fluoropolymer resins, in industrial organic solvents. The coating material preferably exhibits flexibility up to or exceeding 100% extension. Materials most preferred at present as the wear-resistant composite in the practice of the present invention are available from Whifford Plastics Limited, under the trademark, XYLAN, and comprise blends of binder resins, pigments and fluoropolymer resins in one or more industrial organic solvents.

The wear-resistant composite of the present invention is distinguishable from the incorporation of a substantially pure PTFE layer over the fabric layer of endless toothed belts. As noted above, a substantially pure PTFE layer exhibits relatively poor wear resistance and therefore would likely wear off of the belt surface with use. While not intending to be limited to one particular theory, it is presently believed that in the subject invention, wherein a fluorinated polymer such as PTFE is conversely used as a frictional modifier within a highly abrasion-resistant composite matrix, the PTFE does not wear off with use but remains on the driving- or power transmitting surface of the belt for its intended operating lifetime.

It is contemplated that the improvement provided by the present invention would provide significant benefits in all endless belt applications. In such applications, the wear resistant composite forms a coating upon, and a penetrant within at least a portion of the total thickness of a fabric cover element. Both castable and non-castable elastomers may be used as the elastomeric belt portions in this embodiment of the present invention. Examples of suitable castable elastomers include but are not limited to castable polyurethanes (including polyurethanes, polyurethane/ureas and polyureas), plastisols, organosols, liquid chloroprenes, liquid polysulfides, liquid rubbers, silicones, epoxides, urethanes, polyester based resins, polyether based resins, and the like, as well as blends or mixtures thereof. Polyurethane elastomers are generally preferred over other types of castable elastomers at present because of their favorable tensile strength and abrasion resistance and their satisfactory modulus and elasticity. These polyurethanes may be prepared in any conventional manner, such as by compounding a polyurethane prepolymer with a chain extending agent, and optionally an amount of plasticizer or other ingredient if desired. Conventional chain extenders may be utilized, which are generally known to the art.

Non-castable elastomers useful as the belt body portions of such belts which would likely enjoy the benefits provided by the present invention include for example, chloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), natural rubber (NR) and ethylene propylene diene terpolymer elastomer (EPDM), as well as blends or mixtures thereof. Most thermoplastic elastomers are also envisioned within this context. Whether a castable or non-castable elastomer is utilized in the compositions, which form the elastomeric portion(s) of the belt, such compositions may also generally include conventional additives in amounts generally suitable for use in the intended application. Thus for example, such composition may also include a reinforcing, partially reinforcing or non-reinforcing filler in amounts of from about 0 parts per hundred weight of rubber (phr) to about 500 phr; one or more plasticizers in amounts of from about 0 phr to about 30 phr; one or more vulcanization agents or curatives, including sulfur, free-radical-generating materials such as peroxide and ionizing radiation, etc., in amounts of from about 0 phr to about 30 phr; one or more co-agents or activators in amounts of from about 0 to about 100 phr; and one or more antidegradants in amounts of from about 0 phr to about 15 phr etc.. In a preferred embodiment of the present invention, at least one of the elastomer overcord portion and elastomer tooth portion is formed of a suitable HNBR elastomer composition.

The present invention contemplates a process for the production of the belts described above. It is characterized in that a fabric cover element is first treated, preferably by immersion in a suitable cross-linkable material compatible with the elastomeric portions of the belt, optionally in combination with a resin such as resorcinol formaldehyde. This first treatment is performed in such a way that at least a portion of the voids or interstitial spaces formed between the individual fibers and yarns of the fabric cover element remain at least partially free of the treatment material. This allows a significant amount of the wear-resistant composite, applied in a subsequent step, to penetrate at least a portion of the total thickness of the fabric, and to enter into and remain within such voids and interstitial spaces. The pick-up rate of such fabric treatment material is preferably from about 1% to about 50%, more preferably from about 5% to less than about 30%, even more preferably from about 7% to about 25%, and is most preferably from about 10% to about 20%, based on the particular fabric weight employed. While this is a relatively low pick-up rate, it has been surprisingly found that its effect in permitting the wear-resistant composite through at least a portion of the fabric and to permeate the interstices between at least a significant portion of the yarns of the fabric is quite dramatic.

It is not uncommon for fabrics intended for use as belt cover elements to be rubberized by treatment with a suitable cross-linkable-containing material. Typical pick-up rates for treating fabric cover elements in order to rubberize them however is generally from about 30% to about 40% or more. Conversely, according to the present invention, it has been found that deposition of the fabric treatment material in the claimed amounts sufficiently coats the fibers and yarns of the fabric cover element, while leaving sufficient voids in the fabric within which the wear-resistant composite may penetrate and take hold. Increasing the amount of fabric treatment material in this treatment step has been found to reduce the amount of wear-resistant, frictional-modifying coating, which can penetrate the fiber cover element. Thus, while a relatively low amount of fabric cover treatment material serves to allow the coating to penetrate at least a portion of the fabric's total thickness, it has been found that increasing the amount of this treatment actually has a negative impact on the final belt's performance. The improvement in wear resistance provided by the present invention, as evidenced in the comparative test results set forth below, is dramatic.

As a second step, the wear-resistant, friction-modifying composite is applied to at least, but preferably only one side of the thus treated or partially rubberized fabric. Application of the composite may be by any suitable method, including spraying, knife-coating etc., but is preferably by knife-coating, at a pick up rate of preferably from about 5% to about 80%, more preferably from about 20% to about 50%, and most preferably from about 25% to about 35%, based on the dry fabric weight.

As an optional but preferred third step, a second application of at least one cross-linkable material, preferably in a resin-type carrier such as in a resorcinol formaldehyde latex, is effected on a second side of the fabric, i.e., to the surface of the fabric opposite that of the wear-resistant coating. This application is believed to contribute additional adhesive strength to the bond between the fabric layer and the underlying belt elastomer, and to contribute to the formation of a barrier or boundary between the fabric cover and wear-resistant coating on one hand, and the underlying elastomeric belt members on the other. This material may be the same as or different from the fabric treatment material noted above, but is preferably compatible with the balance of the belt components. Application of this material may be by any suitable method including spraying and knife-coating, but is preferably by knife-coating at a pick-up rate of from about 2.5% to about 55%, more preferably from about 15% to about 50%, and is most preferably from about 20% to about 35%, based on the dry fabric weight.

An adhesive treatment may then optionally but preferably be applied to the same second side of the fabric, i.e., the surface of the fabric opposite that of the wear-resistant composite. This adhesive treatment may preferably be in the form of any suitable and/or conventional rubber adhesive composition appropriate for use with the balance of the belt components, many of which are well known in the belt-building art, including but not limited to those available from Compounding Ingredients Ltd., under the trademark, CILBOND 80, and similar adhesives available from The Lord Corporation. Application of this adhesive treatment may be by any suitable method including spraying and knife-coating, but is preferably by knife-coating at a pick-up rate of from about 0 to about 70%, more preferably of from about 1% to about 40%, and most preferably of from about 10% to about 25%, based on the dry fabric weight.

As an additional optional but preferable step, an additional adhesive treatment may be applied to the second side of the treated fabric. Any suitable and/or conventional adhesive material compatible with the surrounding belt materials may be employed in this regard, in amounts typically employed for the purpose. In a preferred embodiment, at least one cross-linkable material compatible with the belt body elastomer is employed in this regard, preferably suspended or dispersed in a suitable solvent which may be liberated upon application of the adhesive composition. Application of such second adhesive treatment material, intended to contribute to the adhesive bond between the fabric layer and the belt body elastomer, may be by any conventional method including spraying, knife coating, etc. The pick-up rate of this material in the fabric cover element may be from about 3% to about 110%, preferably from about 25% to about 80%, and is most preferably from about 40% to about 70% based on the dry fabric weight.

As one skilled in the relevant art would readily appreciate, the fabric should preferably be allowed to dry between each of the successive treatment material applications noted above. Particularly with regard to the application of the wear-resistant, friction-modifying composite to the fabric cover element surface, where, as in a preferred embodiment, the binder constituent is capable of curing, cross-linking or chain-extension, or otherwise polymerizing, the drying operation should involve sufficient time, temperature, and/or other condition to allow for same.

As is well known in the art, fluoropolymers including PTFE exhibit virtually no adhesion to most substrates. Thus, in the present instance it is highly desirable for the wear-resistant composite matrix containing such fluoropolymers to remain remote from the belt elastomer-fabric interface. It is believed that in addition to its ability to allow the wear-resistant composite through a greater portion of the total fabric thickness than would be possible according to other processes or constructions, the fabric treatment and/or subsequent treatment or treatments set forth above furthermore provide at least a partial barrier or boundary layer between the wear-resistant composite and fabric cover element on one hand, and the belt body elastomer on the other. Adhesion between the fabric layer and the underlying belt elastomer may thus be accomplished by more conventional or practical means, e.g., the adhesive compositions here generally described, or any suitable and/or conventional adhesive system. Moreover, because the wear-resistant composite preferably penetrates to great measure within a significant portion of the fabric cover, including within fiber bundles and fabric interstices, it likely resists shearing off even under high mechanical stress.

In a more preferred embodiment of the present invention, a fabric is selected for use as the fabric cover element, which possesses a weave, a warp and weft yarn type and yarn quantity, which combine to define a specific porosity characterized in that it prevents significant encroachment of the wear-resistant composite to the side of the fabric facing and intimately positioned along the underlying belt elastomer. This is distinguishable from those constructions wherein a fabric construction is selected to prevent encroachment of the belt body or tooth elastomer to the outer, sprocket- or sheave-engaging surface of the belt. In the latter instance, encroachment of the belt elastomer through fabric interstices may be reduced or prevented by a relatively loose weave, or high porosity fabric, in that such elastomeric materials typically possess a relatively high viscosity, even at relatively high temperatures. Conversely, in the former instance, the typically very low viscosity of coating materials render reduction or prevention of their encroachment through the fabric in the direction of the belt body much more difficult. In this preferred embodiment, a preferred fabric is formed of a substantially pure nylon 6,6 and contains yarns having a tensile strength of not less than 6.0 g/decitex in their initial state in both the warp and weft directions. One direction is preferably woolly (textured) processed giving the fabric not less than 80% stretch under 2 kg load, as measured on a 25 mm strip. The fabric preferably is constructed to yield a finished weight of at least 385 g/m$^2$ of which at least 90% of the weight is preferably in the woolly processed direction, i.e., in the direction of belt travel. According to this same preferred embodiment of the invention, it is believed that the wear-resistant composite is greatly restricted, or essentially prevented, from contacting the inner, belt elastomer-contact surface of the fabric cover element. While at least one of the fabric cover element treatment, the second treatment and the adhesive treatments disclosed above, in addition to allowing the wear-resistant composite through at least a portion the fabric, form a significant barrier or boundary between the fabric layer and the underlying belt elastomer, it is believed that the incorporation of such low porosity fabric would further enhance this aspect of the invention. Where no such boundary layer exists between the fabric and coating layer on the one hand and the belt body elastomer on the other, it is believed that delamination and diminished operating capacity of the belt would likely occur under extended operation, particularly under high load conditions.

Any suitable and/or conventional method may be employed in performing the balance of the steps required to build the power transmission belts of the present invention. For example, where castable belt elements are utilized in toothed belt manufacture, the production steps may furthermore include wrapping the composite-bearing wear-resistant fabric about the surface of a notched mold portion in a manner such that the composite-coated surface of the fabric cover element is adjacent the notched mold portion; applying a tensile layer about the wear-resistant fabric, such as by helically winding one or more tensile cords about the fabric; introducing a substantially liquid elastomeric material into the mold cavity; and polymerizing the thus formed product. Where non-castable belt elastomers are utilized, i.e., millable gum rubbers, either with or without fiber loading, the remaining belt building steps may include those of positioning the composite-coated fabric cover element as described above within an appropriately configured mold cavity having notch portions for the formation of teeth; disposing a tensile member against the second surface of the fabric cover element, such as by helically winding one or more tensile cords about the fabric; disposing elastomeric material against the tensile member; disposing additional alternating arrangements of tensile members and/or elastomeric material against this tensile member as required of a given construction; applying sufficient temperature and pressure to cure or vulcanize the elastomer materials; and removing the assembly from the mold cavity. The tooth portions of such belts may moreover have any suitable shape, including curvilinear, trapezoidal, etc.

In a preferred embodiment of the present invention, the wear-resistant composite and various fabric- and adhesive treatments are performed and the thus-treated fabric cover element applied to the belt, prior to vulcanization or curing of the elastomeric belt elements. Thereafter, the assembly may be vulcanized or cured as appropriate for the components.

Wear and the dimensional changes accompanying wear are primary sources of belt slip noise, impact noise and premature failure in endless toothed belts. In order to compare the dimensional stability and wear characteristics of a belt made in accordance with the provisions of the present invention to other, less desirable constructions, some of which may be found in the prior art, several belts were constructed as described below in Table 1, and were subjected to a room temperature wear-resistance analysis. The test apparatus consisted of a two-pulley drive arrangement, with each pulley having 19 grooves and a RU profile. The belts were operated at a speed of 6300 RPM as measured on the pulley, at a tension between the pulleys of 530 N, with a belt pitch of 0.375 inches (9.525 mm). The test was conducted at 25°+/−5° C.

TABLE 1

Belt Constructions for Wear-Resistance Analysis

| | Belt 1 | Comparative Belt A | Comparative Belt B | Comparative Belt C |
|---|---|---|---|---|
| Overcord and tooth elastomer | HNBR | HNBR | HNBR | HNBR |
| fabric cover cover treatment | Yes Fabric immersed into treatment material. Treatment pick-up of 10–20% | Yes Fabric immersed into treatment material. Treatment pick-up of 30–40% | Yes Fabric immersed into treatment material. Treatment pick-up of 30–40% | Yes Fabric immersed into treatment material. Treatment pick-up of 30–40% |
| wear-resistant composite | Applied to pulley side of treated fabric; fabric thereafter applied to belt, and belt vulcanized. | Applied to pulley side of treated fabric; fabric thereafter applied to belt, and belt vulcanized. | Applied to fabric on pre-vulcanized belt. | None |

In the above example and comparative examples, except as provided in Table 1, belts were generally constructed according to the description provided above for FIG. 1. The belts were each constructed to be 15 mm wide and to have 97 longitudinally spaced teeth of equivalent dimensions, with a 9.525-mm pitch. The belt overcord section and tooth portions in each case comprised an HNBR elastomer composition containing approximately 60 parts per hundred weight of elastomer (phr) of Carbon black, about 15 phr of plasticizer, about 3.5 phr of zinc oxide, about 2 phr of sulfur, and a dithiocarbamate curative. The fabric cover in each case comprised nylon 6.6 yarns in a 2×2-twill weave, wherein the weft yarn was false twist texturized. The fabric cover treatment material in all instances comprised a resorcinol-formaldehyde latex/elastomer blend compatible with the HNBR belt body elastomer. The wear-resistant composite consisted in each case of a fluorocarbon coating comprising 50:50 by weight mixture composition available by Whifford Plastics Ltd., under the trademark, XYLAN (blend of XYLAN 1642-A-1429 and 1642-B-1452). Each belt further comprised a resin-based, rubber-bonding adhesive cement produced by Compounding Ingredients Ltd., under the trademark, CILBOND 80, at a pick-up of about 16% based on the dry fabric weight and an additional adhesive comprising a HNBR composition dissolved in methyl ethyl ketone at a concentration of approximately 28%, at a pick up rate of about 55% based on the dry fabric weight.

For the comparison, the belts were first weighed, then mounted on the test apparatus and then re-weighed after 150 hours on test to compare weight loss among the various constructions. Belt 1 experienced a weight loss of 0.26 grams; Comparative Belt A experienced a weight loss of 0.45 grams; Comparative Belt B experienced a weight loss of 0.6 grams; and Comparative Belt C experienced a weight loss of approximately 1.6 grams. While each of the comparative examples employing the wear-resistant composite layer or coating theoretically possessed the same effective coefficient of friction as that of Belt 1 of the present invention, the latter exhibited greatly improved wear resistance over each of the comparative examples. The results of this analysis indicate that the inventive belts incorporating the wear resistant composite as their power transmitting surface interface portions exhibit substantially improved dimensional stability and wear resistant characteristics compared to belts having no wear-resistant composite coating, as well as compared to those belts employing a similar composite applied in a different manner or according to a different process. The belts of the present invention are thus likely to enjoy substantially longer operating life under high load and/or high-speed conditions, as well as decreased slip and impact noise. It is presently believed that the belts of the present invention would be able to tolerate significantly higher tension in use compared to known belt constructions, due to the inventive belts' improved abrasion- or wear-resistance performance capabilities, as well as their excellent mechanical characteristics.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A toothed power transmission belt having a tensile-loaded body portion composed of an elastomeric material, a plurality of spaced teeth bonded with and disposed along at least the inner periphery of the body portion, a fabric cover element having voids therein and positioned intimately along at least a portion of the outer surface of said body portion's inner periphery, made according to the method characterized in that:
   a) said fabric cover element is immersed in a first treatment composition containing at least one cross-linkable component, to effect a pick-up rate of from about 1% to about 25%, based on the dry fabric weight to fill only a portion of said voids;
   b) a wear-resistant composite comprising at least one binder constituent and at least one friction-modifying constituent is applied to a first surface of said fabric cover element forming the power transmitting surface of said belt, to fill a portion of said voids at said first surface;
   c) the fabric cover element is applied to the outer surface of said belt; and
   d) the belt is vulcanized;
   and further characterized in that said wear-resistant composite comprising at least one friction-modifying constituent penetrates at least a portion of the total thickness of the fabric cover element, and is substantially separated from the elastomeric belt body by a boundary, and that the binder is abrasion-resistart.

2. The power transmission belt of claim 1 wherein said boundary comprises at least one of said first treatment composition and a second treatment material containing at least one cross-linkable constituent.

3. The power transmission belt of claim 1 wherein said boundary comprises said fabric cover element, said fabric cover element possessing a weave, a warp and weft yarn type and a warp and weft yarn quantity, which define a porosity, said porosity being characterized in that said composite penetrates less than the entire thickness of said fabric cover element.

4. The power transmission belt of claim 1 further comprising the step of applying at least one additional rubber bonding adhesive composition to a second surface of the fabric cover element opposite the power transmitting surface, prior to said vulcanization.

5. A toothed power transmission belt comprising a fabric cover element positioned intimately along at least a portion of the outer surface of an elastomeric belt body, said fabric cover element characterized by a generally alternating arrangement of yarns and voids; a wear-resistant composite comprising at least one binder constituent and at least one friction-modifying constituent bonded to at least a first surface of said fabric cover element forming a power transmitting surface of the belt; and characterized in that:
   said fabric cover element bears a first coating of a first treatment composition containing at least one cross-linkable component contained within only a portion of said voids and present on said yarns in an amount from about 1% to about 25% based on the dry fabric weight;
   the binder constituent possesses abrasion resistance; and
   at least a portion of said wear-resistant composite is present as a second coating within at least a portion of the total thickness of said fabric cover element such that at least a portion of said friction-modifying constituent resides within a portion of said voids in said fabric cover element, and is separated from at least a portion of said binder constituent by a boundary; and at least a portion of said wear-resistant composite is polymerized and exhibits flexibility approaching or exceeding 100% extension.

6. The power transmission belt of claim 5 further comprising a boundary between at least a portion of said friction-modifying constituent and said body portion.

7. The power transmission belt of claim 5 wherein the wear-resistant composite resides within only a portion of the total thickness of the fabric cover element, on the power-transmitting surface of the belt, with the portion of the fabric cover element making contact with the elastomeric belt body being substantially free of the wear-resistant composite.

8. A toothed power transmission belt adapted to mate with a pulley, comprising an elastomeric belt body;
   a porous fabric cover element comprised of yarns formed of individual fibers producing interstitial spaces and voids, having one side joined to the belt body; and the opposite side forming a power-transmitting surface adapted to drive or be driven by the pulley;
   a first treatment composition containing at least one cross-linkable component coating the fabric cover element, and present on said yarns in an amount from about 1% to about 25% based on the dry fabric weight, such that a portion of the voids or interstitial spaces formed between the individual fibers and yarns of the fabric cover element remain free of the first composition;
   a wear-resistant composite comprising at least one abrasion-resistant binder constituent and at least one friction-modifying constituent residing within such voids or interstitial spaces within only a portion of the total thickness of the fabric cover element, on the power-transmitting side of the belt; and
   a second composition containing at least one cross-linkable material, residing at the one side of the fabric cover element adjacent the belt body, and constituting a boundary separating the wear-resistant composite from the belt body.

9. The power transmission belt of claim 8 wherein an adhesive is positioned between and joins the second composition and the belt body.

10. The power transmission belt of claim 8 wherein one or both of the and second compositions are formed of resorcinol formaldehyde latex.

11. The power transmission belt of claim 8 wherein the wear-resistant composite is a dispersion of a fluoropolymer in the abrasion-resistant binder.

12. The power transmission belt of claim 8 wherein the wear-resistant composite exhibits substantial flexibility approaching or exceeding 100% extension.

* * * * *

UNITED STATES PATENT AND TRADEMARK OFFICE
CERTIFICATE OF CORRECTION

PATENT NO. : 7,041,021 B2  
APPLICATION NO. : 10/164267  
DATED : May 9, 2006  
INVENTOR(S) : Daniel Pattie Gibson and James Gordon Mackintosh

Page 1 of 1

It is certified that error appears in the above-identified patent and that said Letters Patent is hereby corrected as shown below:

Col 13, line 53, delete "abrasion-resistart" and replace it with --abrasion-resistant--  
Col 15, line 2, after the phrase "of the", add --first--

Signed and Sealed this

Twentieth Day of May, 2008

JON W. DUDAS  
*Director of the United States Patent and Trademark Office*